US008869127B2

(12) United States Patent
Dolby et al.

(10) Patent No.: US 8,869,127 B2
(45) Date of Patent: Oct. 21, 2014

(54) REFACTORING PROGRAMS FOR FLEXIBLE LOCKING

(75) Inventors: Julian Dolby, Bronx, NY (US); Manu Sridharan, Boulder, CO (US); Frank Tip, Ridgewood, NJ (US); Max Schaefer, St. Clement's (GB)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 12/983,581

(22) Filed: Jan. 3, 2011

(65) Prior Publication Data

US 2012/0174082 A1 Jul. 5, 2012

(51) Int. Cl.
*G06F 9/44* (2006.01)

(52) U.S. Cl.
USPC .......................................... 717/151; 717/150

(58) Field of Classification Search
USPC ......................................................... 717/151
See application file for complete search history.

(56) References Cited

U.S. PATENT DOCUMENTS

| 2006/0282476 | A1* | 12/2006 | Dolby et al. | 707/201 |
|---|---|---|---|---|
| 2010/0122253 | A1* | 5/2010 | McCart | 718/100 |
| 2011/0219361 | A1* | 9/2011 | Dolby et al. | 717/136 |
| 2012/0174082 | A1* | 7/2012 | Dolby et al. | 717/151 |

OTHER PUBLICATIONS

Muskalla et al., Concurrency-Related Refactorings for JDT, Eclipse Foundation (Aug. 4, 2008) retrieved from http://wiki.eclipse.org/Concurrency-related_refactorings_for_JDT on Apr. 4, 2013.*
Goetz, Java theory and practice: More flexible, scalable locking in JDK 5.0, IBM (Oct. 26, 2004) retrieved from http://www.developerfusion.com/article/84484/light-up-your-development-with-selenium-tests/ on Jan. 12, 2014.*
Balaban, I. et al., Refactoring support for class library migration. In OOPSLA, 2005.
Dig, D., et al., Refactoring Sequential Java Code for Concurrency via Concurrent Libraries. In ICSE, 2009.
Dig, D., et al., ReBA: Refactoring-aware Binary Adaptation of Evolving Libraries. In ICSE, 2008.
Dig, D., et al., RELOOPER: Refactoring for Loop Parallelism. Technical report, UIUC, 2010. http://hdl.handle.net/2142/14536.
Donovan, A., et al., Converting Java Programs to Use Generic Libraries. In OOPSLA, 2004.

(Continued)

*Primary Examiner* — Don Wong
*Assistant Examiner* — Theodore Hebert
(74) *Attorney, Agent, or Firm* — Jon A. Gibbons; Fleit Gibbons Gutman Bongini & Bianco PL

(57) ABSTRACT

Disclosed is a novel computer implemented system, on demand service, computer program product and a method that provides a set of lock usages that improves concurrency resulting in execution performance of the software application by reducing lock contention through refactoring. More specifically, disclosed is a method to refactor a software application. The method starts with accessing at least a portion of a software application that can execute in an operating environment where there are more two or more threads of execution. Next, a determination is made if there is at least one lock used in the software application to enforce limits on accessing a resource. In response to determining that there is a lock with a first type of construct with a given set of features, the software application is refactored with the lock to preserve behavior of the software application.

25 Claims, 10 Drawing Sheets

```
public class SyncMap {
  private final Map map;
  public SyncMap(Map map){
    this.map = map;
  }
  public synchronized Object put(Object k, Object v) {
    return map.put(k, v);
  }
  public synchronized Object get(Object k) {
    return map.get(k);
  }
  public synchronized int size(){
    return map.size();
  }
}
```

```
public class SyncMap {
  private final ReentrantLock lock;
  private final Map map;
  public SyncMap(Map map){
    this.map = map;
    lock = new ReentrantLock();
  }
  public Object put(Object k, Object v) {
    lock.lock();
    try {
      return map.put(k, v);
    } finally { lock.unlock(); }
  }
  public Object get(Object k) {
    lock.lock();
    try {
      return map.get(k);
    } finally { lock.unlock(); }
  }
  public int size() {
    lock.lock();
    try {
      return map.size();
    } finally { lock.unlock(); }
  }
}
```

(56) References Cited

OTHER PUBLICATIONS

Fuhrer, R., et al., Efficiently Refactoring Java Applications to Use Generic Libraries.In ECOOP, 2005.
Fuhrer, R., et al., Concurrency Refactoring for X10. In Proceedings of the Third Workshop on Refactoring Tools, 2009.
Griswold, W.G. Program Restructuring as an Aid to Software Maintenance. PhD thesis, University of Washington, 1991. Technical Report Aug. 4, 1991.
Griswold, W.G., et al., Automated Assistance for Program Restructuring. ACM Trans. Softw. Eng. Methodol., 2(3), 1993.
Herlihy. M. et al., Transactional memory: Architectural support for lock-free data structures. In ISCA, pp. 289-300, 1993.
Kie'zun, A., et al., Refactoring for Parameterizing Java Classes. In ICSE, 2007.
Markstrum, S., et al., Towards Concurrency Refactoring for X10. In PPOPP, 2009.
Michael, M.M., et al., Simple, fast, and practical non-blocking and blocking concurrent queue algorithms. In PODC, pp. 267-275, 1996.
Murphy-Hill , E.R., et al., Breaking the barriers to successful refactoring: observations and tools for extract method. In ICSE, 2008.
Murphy-Hill, E.R., et al., How we refactor, and how we know it. In ICSE, 2009.
Opdyke, W.F., Refactoring Object-Oriented Frameworks. PhD thesis, UIUC, 1992.
Reichenbach, C., et al., Program Metamorphosis. In ECOOP, 2009.
Schäfer. M., et al., Specifying and Implementing Refactorings. In OOPSLA, 2010.
Schäfer, M., et al., Correct Refactoring of Concurrent Java Code. In ECOOP, 2010.
Tip, F., Refactoring Using Type Constraints. In SAS, 2007.
Verbaere, M., et al., Jungl: a scripting language for refactoring. In ICSE, 2006.
von Dincklage. D., et al., Converting Java Classes to Use Generics. In OOPSLA, 2004.
Wloka, J., et al., Refactoring for Reentrancy. In ESEC/FSE, 2009.
Kegel, H., et al., Systematically Refactoring Inheritance to Delegation in Java. In ICSE, 2008.
Steimann, F., et al., From Public to Private to Absent: Refactoring Java Programs under Constrained Accessibility. In ECOOP, 2009.
Tip, F., et al., Refactoring for Generalization using Type Constraints. In OOPSLA, 2003.
Salcianu, A., et al., Purity and Side Effect Analysis for Java Programs, In Proceedings of the $6^{th}$ International Conference on Verification, Model Checkling and Abstract Interpretation (VMCAI), pp. 199-215, 2005.
Shafer, M . et al., "Stepping Stones Over the Refactoring Rubicon—Lightweight Language Extensions to Easily Realise Refactorings". European Conference on Object-Oriented Programming (ECOOP). Jul. 2009. Programming Tools Group, University of Oxford, UK.

\* cited by examiner

```
public class SyncMap {
private final Map map;
public SyncMap(Map map){
this.map = map;
}
public synchronized Object put(Object k, Object v) {
return map.put(k, v);
}
public synchronized Object get(Object k) {
return map.get(k);
}
public synchronized int size(){
return map.size();
}
}
```

FIG. 1A

```
public class SyncMap {
private final ReentrantLock lock;
private final Map map;
public SyncMap(Map map){
this.map = map;
lock = new ReentrantLock();
}
public Object put(Object k, Object v) {
lock.lock();
try {
return map.put(k, v);
} finally { lock.unlock(); }
}
public Object get(Object k) {
lock.lock();
try {
return map.get(k);
} finally { lock.unlock(); }
}
public int size() {
lock.lock();
try {
return map.size();
} finally { lock.unlock(); }
}
}
```

FIG. 1B

```
public class SyncMap {
private final ReadWriteLock lock;
private final Map map;
public SyncMap(Map map){
this.map = map;
lock = new ReentrantReadWriteLock();
}
public Object put(Object k, Object v) {
lock.writeLock().lock();
try {
return map.put(k, v);
} finally { lock.writeLock().unlock(); }
}
public Object get(Object k) {
lock.readLock().lock();
try {
return map.get(k);
} finally { lock.readLock().unlock(); }
}
public int size() {
lock.readLock().lock();
try {
return map.size();
} finally { lock.readLock().unlock(); }
}
public int sizeVialter() {
lock.readLock().lock();
try {
Iterator i = map.entrySet().iterator();
int count = 0;
while (i.hasNext()) {
count++; i.next();
}
return count;
} finally { lock.readLock().unlock(); }
}
}
```

FIG. 1C

| JVM | # CORES | # READERS | # WRITERS | THROUGHPUT (OPS/SECOND) | | |
|---|---|---|---|---|---|---|
| | | | | SYNCHRONIZED | REENTRANT | READ-WRITE |
| Sun 1.6.0.07 | 8 | 9 | 1 | 528.7 | 360.9 | 1072.3 |
| Sun 1.6.0.07 | 8 | 1 | 9 | 273.2 | 218.9 | 181.8 |
| Sun 1.5.0.15 | 8 | 9 | 1 | 244.3 | 368.9 | 1677.7 |
| Sun 1.5.0.15 | 8 | 1 | 9 | 227.4 | 179.8 | 199.2 |
| Sun 1.6.0_20 | 2 | 9 | 1 | 514.3 | 524.6 | 3229.5 |
| Sun 1.6.0_20 | 2 | 1 | 9 | 262.9 | 252.4 | 245.8 |
| Sun 1.5.0_24 | 2 | 9 | 1 | 472.5 | 411.8 | 2079.8 |
| Sun 1.5.0_24 | 2 | 1 | 9 | 243.2 | 213.5 | 187.1 |

FIG. 2

```
class C {
private Map m = new HashMap();
public Object get(Object k) {
synchronized (m) {
return m.get(k);
}
}
public void put(Object k, Object v) {
synchronized (m) {
m.put(k, v);
}
}
}
```

FIG. 3

```
 1: procedure CONVERT TO REENTRANT LOCK (AbstractMoni
    tor M):
 2: createLockField (M)
 3: for all monitor actions a do
 4:     if M(a) ⊆ M then
 5:         transformAction(a)
 6:     else
 7:         assert M(a) ⊥ M 8: procedure createLockField (AbstractMonitor M):
 9: if M is FM (f) then
10:     assert f is declared in a modifiable type
11:     create lock field l as sibling field of f
12:     for all assignments a to f do
13:         insert assignment l = new ReentrantLock() after a
14: else if M is CM (C) then
15:     assert C is a modifiable type
16:     create static lock field l in C
17: else /* M must be of the form TM (C) */
18:     assert C is a modifiable class
19:     create lock field l in C
```

```
20: procedure transformAction (MonitorAction a):
21:     assert a is from source code
22:     l ← mkLockAccess(a)
23:     if a is synchronized (e) { ... } then
24:         replace a with
                l.lock(); try { ... } finally {
                l.unlock(); }
25:     else if a is a synchronized method then
26:         remove synchronized modifier from a
27:         replace body of a with
                l.lock(); try { ... } finally {
                l.unlock(); }
28:     else /* a must be call to wait or notify */
29:         ...
30: function mkLockAccess (MonitorAction a):
31:     e ← me(a)
32:     if M(a) is FM (f) then /* e is of the form e'.f */
33:         return e'.l
34:     else if M(a) is CM (C) then
35:         return C.l
36:     else /* M(a) must be of the form TM (C) */
37:         return e.l
```

FIG. 4

```
1: procedure INTRODUCE READ-WRITE LOCK (Field f):
2:   assert f has type ReentrantLock
3:   change declared type of f to ReentrantReadWriteLock
4:   for all assignments to f do
5:     assert f is assigned a new ReentrantLock object
6:     change to assignment of new
           ReentrantReadWriteLock
7:   for all uses of f do
8:     assert use is call f.lock() or f.unlock() in a
           try-finally construction with body b
9:     if canUseReadLock(b) then
10:      replace use of f with f.readLock()
11:    else
12:      replace use of f with f.writeLock()

13: function canUseReadLock (Block b):
14:   S ← instructions in b
15:   if b is in constructor or method m then
16:     P ← parameters of m, including this if m is not static
17:   else
18:     P ← ∅
19:   return ¬nonLocalSideEffects(S,P)

20: function  nonLocalSideEffects (Set<Instr>  S,
        Set<Param> P):
21:   for all instructions i ∈ S do
22:     if nonLocalWrite(i,P) then
23:       return true
24:     else if i is a method call then
25:       for all methods m' possibly called by i do
26:         S' ← instructions of m'
27:         P' ← {f : formals of m' | a is actual for f ∧
                   mayAliasNonLocalState(a, P)}
28:         if nonLocalSideEffects(S',P') then
29:           return true
30:   return false 31: function nonLocalWrite (Instr i, Set<Param> P):
32:   if i writes a static field then
33:     return true
34:   else if i writes an instance field or array element then
35:     return mayAliasNonLocalState(basePtr(i),P)
36:   else
37:     return false
```

FIG. 5

```
public String toString() {
  fLock.lock();
  try {
    StringBuffer result = new StringBuffer(f1.toString());
    result.append("\n");
    result.append(f2.toString());
    return result.toString();
  } finally {
    fLock.unlock();
  }
}
```

FIG. 6

| BENCHMARK | FM | CM | TM | INVOLVES LIBRARY | AMBIGUOUS MON. ACTION | UNMODIFIABLE TYPE | REFACTORABLE |
|---|---|---|---|---|---|---|---|
| hsqldb | 10 | 22 | 714 | 2 | 25 | 23 | 93.3% |
| xalan | 7 | 4 | 79 | 4 | 6 | 8 | 80.0% |
| hadoop-core | 10 | 40 | 362 | 0 | 61 | 22 | 79.9% |
| jgroups | 110 | 6 | 324 | 76 | 38 | 59 | 60.7% |
| cassandra | 0 | 13 | 49 | 1 | 0 | 0 | 98.4% |

FIG. 7

| BENCHMARK | READ-WRITE LOCKS | USES OF | | CORRECTLY INFERRED READ LOCKS |
|---|---|---|---|---|
| | | READ LOCK | WRITE LOCK | |
| hsqldb | 5 | 20 | 51 | 5 (25.0%) |
| hadoop-core | 1 | 8 | 2 | 8 (100%) |
| jgroups | 1 | 5 | 7 | 5 (100%) |
| MINA | 2 | 5 | 6 | 5 (100%) |
| cassandra | 2 | 13 | 7 | 6 (46.2%) |
| seraph | 2 | 4 | 5 | 4 (100%) |

FIG. 8

REFACTORING PROGRAMS FOR FLEXIBLE LOCKING

STATEMENT REGARDING FEDERALLY SPONSORED RESEARCH

Not Applicable

BACKGROUND

As multi-core processors are becoming widely available, programs are becoming more concurrent to take advantage of the available parallelism. However, increasing concurrency in a program is often non-trivial, due to various potential scalability bottlenecks. One common bottleneck is lock contention, where scalability is limited by many threads waiting to acquire some common lock in order to safely access shared memory.

Various solutions exist for addressing lock contention, each with benefits and drawbacks. Approaches that avoid locks altogether include lock-free data structures (see, e.g., [16]) and transactional memory (TM) [11]. However, writing correct lock-free data structures requires more expertise than can be expected from most programmers, and the semantics of TM may not be suitable in some cases (e.g., if I/O needs to be performed). Making locking more fine-grained can also increase concurrency, but potentially risks introducing subtle race conditions. In the context of Java, the standard java.util.concurrent library (in the sequel abbreviated as j.u.c.) provides a number of data structures and locking constructs that could also be helpful, with their own tradeoffs. With all these options, there is a strong need for tool support to help programmers experiment with different solutions to see what works best in a particular situation.

SUMMARY

The present invention was recently disclosed in a paper entitled "*Refactoring Java Programs For Flexible Locking.*" This paper was accepted for publication and will be published in ICSE 2011 Waikiki, Honolulu, Hi. The teachings of this paper are hereby incorporated by reference in its entirety.

Recent versions of the Java standard library offer flexible locking constructs that go beyond the language's built-in monitor locks in terms of features, and that can be fine-tuned to suit specific application scenarios. Under certain conditions, the use of these locking constructs can improve performance significantly, e.g., by reducing lock contention or locking overheads. However, the code transformations needed to convert from one kind of lock to the other are non-trivial, and great care must be taken to update lock usage throughout the program consistently. An embodiment of the present invention developed is Relocker, an automated tool that assists programmers with refactoring synchronized blocks into ReentrantLocks and ReadWriteLocks, to make exploring the performance tradeoffs associated with different types of locks easier. In experiments on a collection of real-world Java applications, Relocker was able to refactor over 80% of built-in monitors into ReentrantLocks. Additionally, the tool could automatically infer ReadWriteLocks in most cases where programmers had previously introduced them manually.

Disclosed is a novel computer implemented system, on demand service, computer program product and a method that provides a set of lock usages that increases concurrency resulting in improved execution performance of the software application by reducing lock contention through refactoring.

More specifically, disclosed is a computer-implemented method to refactor a software application. The method starts with accessing at least a portion of a software application that can execute in an operating environment where there are more two or more threads of execution. One example of a programming language in which a software application may be written is Java. However, the true scope and spirit of the present invention is not limited to Java. Next, a determination is made if there is at least one lock used in the software application to enforce limits on accessing a resource. In response to determining that there is a lock with a first type of construct with a given set of features, the software application is refactored in a way that preserves behavior of the software application. Non-limiting examples of the features of the first type of construct are an acquire lock and a release lock, and a condition variable.

The refactoring is performed by determining at least one type of usage of the lock including which type of usages of the lock must be refactored together and reassigning the lock to one of a set of lock usages with a second type of construct. A non-limiting example of the set of lock usages with the second type of construct is the use of special features. Finally, the identified lock usages are transformed to the corresponding usages for the second type of construct, such as, a read-write lock.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

FIG. 1 displays 3 versions of an example Java program illustrating different locking constructs.

FIG. 2 is a table illustrating a performance comparison of a synthetic benchmark using the present invention.

FIG. 3 is an example Java program illustrating monitor actions on unshared fields.

FIG. 4 is an example pseudo-code illustrating refactoring CONVERT TO REENTRANT LOCK.

FIG. 5 is an example pseudo-code illustrating refactoring INTRODUCE READ-WRITE LOCK.

FIG. 6 is an example Java program illustrating local side-effects.

FIG. 7 is a table illustrating the results of our evaluation of the CONVERT TO REENTRANT LOCK refactoring.

FIG. 8 is a table illustrating the results of our evaluation of the INTRODUCE READ-WRITE LOCK refactoring.

DETAILED DESCRIPTION

Figure 9:
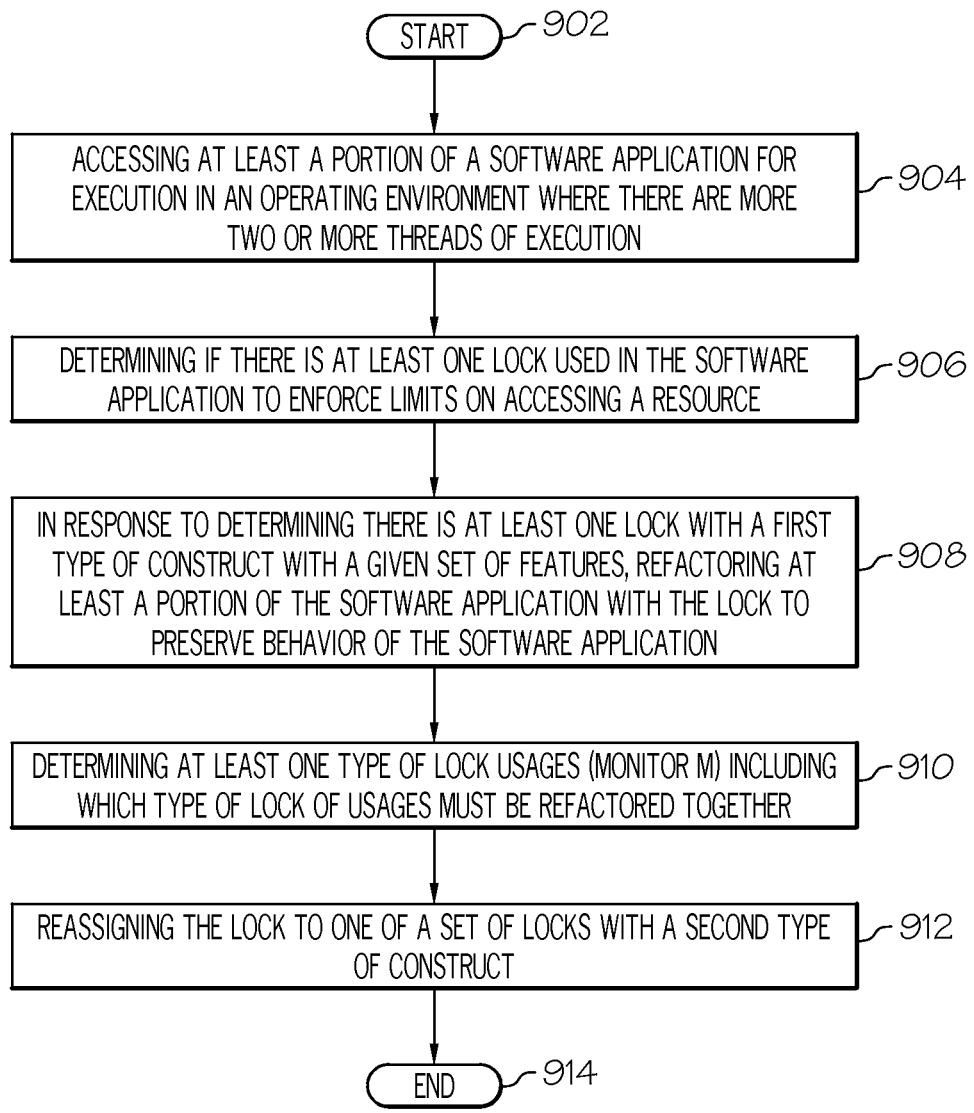
FIG. 9 is a flow diagram of the computer implemented method of example to refactor a software application.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others.

In general, unless otherwise indicated, singular elements may be in the plural and vice versa with no loss of generality. In the drawing like numerals, refer to like parts through several views.

1. Introduction

The present invention focuses on refactoring support for the advanced locking constructs available in j.u.c. (See generally http://download.oracle.com/javase/6/docs/api/java/util/concurrent/package-summary.html). The ReentrantLock type enables many features unsupported by Java's built-in locks, such as non-block-structured lock operations, checking if a lock is being held (tryLock( )), interrupting lock acquisition, and specifying fairness behavior under contention. Additionally, the ReadWriteLock type enables distinguished reader and writer locks, where multiple threads holding the reader lock may execute concurrently. The present invention provides programmers with refactoring tools that support the transition from standard monitor locks to these advanced lock types. Many difficulties arise when manually transforming a program to use the locking constructs of j.u.c., motivating better tool support. First, these constructs lack the concise and intuitive syntax of the synchronized blocks associated with Java's standard monitor locks. Instead, locks are modeled as objects, and lock operations as method calls, and the burden is on the programmer to ensure that acquisition and release of locks are properly matched. Second, the relative performance of different lock types strongly depends on the number of threads and their workload, and on the architecture and JVM being used. As we shall show in Section 2, these performance tradeoffs are often unclear, and may change as programs and JVMs evolve. Therefore, programmers may need to switch back and forth between different lock types to determine the best lock for the job. Third, the transformation from one locking construct to another can require tricky non-local reasoning about program behavior. All code blocks using the same lock must be transformed together to ensure behavior preservation, and discovering all such code blocks can be non-trivial. In some cases, the migration to advanced locks is impossible when the program extends a framework that relies on a specific form of synchronization. Also, introducing read-write locks requires careful reasoning about where a read lock is safe to introduce, as incorrect use of a read lock can lead to subtle race conditions.

One embodiment of the present invention developed is Relocker, an automated refactoring tool that can replace standard monitor locks with ReentrantLocks and ReadWriteLocks. Building a practical tool for performing these lock refactorings is challenging because many of the correctness conditions and transformations involved require knowledge about object aliasing and possible heap side effects, but most analyses for computing such information are unsuitable for use in a refactoring tool due to performance, whole-program assumptions, etc. Relocker is carefully designed to be able to automate a large percentage of the code transformations required for locking in real-world programs while only using analyses suitable for a practical refactoring tool.

The present invention provides:

Algorithms for converting from standard monitor locks to ReentrantLocks, and for converting from ReentrantLocks to ReadWriteLocks.

An implementation of these algorithms in an automated refactoring tool called Relocker.

An evaluation of Relocker on a set of Java programs, demonstrating that Relocker was able to refactor over 80% of all monitor locks into ReentrantLocks, and demonstrating that, on several programs that already used ReadWriteLocks, Relocker was able to infer read-locks in most cases where programmers had previously introduced them manually.

Note that refactoring ReentrantLocks and ReadWriteLocks back into standard monitor locks is straightforward, provided that none of the features specific to the advanced lock types are used.

The remainder of this invention is organized as follows. Section 2 presents background on the advanced lock types from j.u.c. and an example to motivate our refactorings. Sections 3 and 4 present algorithms for converting from monitor locks to ReeentrantLocks, and from the latter to ReadWriteLocks, respectively. In Section 5, we present the implementation of Relocker and its evaluation on a set of Java benchmarks. Section 6 discusses related work, and conclusions are presented in Section 7.

2. Motivating Example

In this section, we give an overview of our proposed refactorings via three versions of an example class implemented with the different locking constructs. We introduce the different locking constructs and present variants of the example class using each of these constructs in Section 2.1. Then, in Section 2.2, we discuss the complex performance tradeoffs between the variants, motivating the need for a refactoring tool to enable experimentation. Finally, Section 2.3 illustrates some challenges of performing the refactorings in the context of the examples.

2.1 Example

FIG. 1 illustrates the different locking constructs involved in our refactorings. The figure shows three different implementations of a class SyncMap, a synchronization wrapper similar to the ones available in class java.util.Collections. Each SyncMap implementation handles all Map operations by acquiring a lock, delegating to the corresponding operations in a contained Map object, and finally releasing the lock.

The program of FIG. 1(a) uses the standard monitor locks that are associated with Java's synchronized blocks. While these locks have the benefit of concise syntax and low overhead in the uncontended case, there are situations where more flexibility is required, and where their performance is suboptimal. To address these shortcoming, two alternative types of locks are available in Java standard libraries since Java 5.0, in package java.util.concurrent.locks:

ReentrantLock has similar behavior to a standard monitor lock, but is more flexible by (i) allowing non-block-structured regions to be protected by locks, (ii) supporting tryLock( ), a mechanism for testing whether a lock is available, and (iii) supporting fairness parameters and multiple condition variables.

A ReadWriteLock has an associated read lock and write lock. Only one "writer" thread may execute while holding the write lock, but multiple "reader" threads can execute concurrently while holding the read lock (as long as no thread holds the write lock). This construct enables better performance when write operations are relatively infrequent.

Both of these types of locks require slightly more awkward syntax than traditional synchronized blocks: the programmer creates a lock by calling the constructor for the appropriate lock type, and must call methods on the returned lock object to perform lock( )/unlock( )/tryLock( ) operations.

FIG. 1(b) shows an alternative implementation of class SyncMap based on ReentrantLocks that is semantically equivalent to the one in FIG. 1(a). In this version, the lock is created when the SyncMap-object is being constructed, a call to lock( ) is inserted at the beginning of each method, and a call to unlock( ) is executed before returning. Note that a try-finally construct must be used in order to ensure that the lock is released when a method exits exceptionally. The solution based on ReadWriteLocks shown in FIG. 1(c) is analogous to that version, but it utilizes the read lock, obtained by invoking method readLock( ), for methods that do not update the Map; only method put( ) requires the use of the write lock.

2.2 Performance Tradeoffs

The performance differences between the different locking constructs can be both dramatic and unpredictable. FIG. 2 is a table of a performance comparison of a synthetic benchmark using our different implementations of SyncMap on different JVMs and hardware. The benchmark spawns some number of reader and writer threads that respectively perform random reads (i.e. get( ) and containsKey( ) operations) and writes (i.e. put( ) operations) to a shared SyncMap, and then measures throughput in terms of total operations per second. (See the full benchmark code, which is available at http://progtools.comlab.ox.ac.uk/projects/refactoring/Relocker.) The final three columns of FIG. 2 give these throughput numbers for the SyncMap implementations using synchronized methods (FIG. 1(a)), reentrant locks (FIG. 1(b)), and read-write locks (FIG. 1(c)).

Switching to a different type of lock can have significant performance benefits. For example, switching from a monitor-based implementation of SyncMap to one based on ReadWriteLocks yields a dramatic increase in throughput in a scenario where read operations dominate. In our experience, the relative performance of different types of locks strongly depends on the mix of read and write operations, and on the architecture and JVM being used. For example, standard monitor locks outperform read/write locks if the example program is changed to use 9 writer threads and 1 reader threads. Furthermore, ReentrantLocks significantly outperform standard monitor locks on Sun's Java 5 JVM. In our opinion, these results should be interpreted that, in practice, careful experimentation is needed to determine which locks perform best, and this argues strongly for refactoring tools that make it easy to switch between different types of locks.

2.3 Refactoring Challenges

The Relocker tool that we developed is capable of automatically inferring the version of SyncMap of FIG. 1(b) from the original code in FIG. 1(a). While the transformation needed to perform the refactoring is fairly straightforward for the simple example under consideration, a slightly more involved transformation is sometimes needed. Also, determining when the transformation is safe requires non-local reasoning. With the SyncMap example, in addition to the code shown, the refactoring must check which of the other synchronized blocks in the program might lock on a SyncMap object. This check requires aliasing information, which is typically computed with expensive whole-program analysis. However, we have devised techniques that are sufficient for handling typical usage of synchronized blocks and methods while avoiding any costly whole-program analysis. Section 3 details our algorithm for refactoring standard monitor locks into ReeentrantLocks.

Relocker can also automatically refactor from ReentrantLocks to ReadWriteLocks, transforming the class in FIG. 1(b) into that of FIG. 1(c). A key goal of this refactoring is to introduce as many read locks as possible, in order to increase potential parallelism in the refactored program. However, determining when a read lock can be used safely can be quite challenging in the presence of heap updates, only some of which are relevant to locking.

Consider the (contrived) sizeVialter( ) method in FIG. 1(c), which computes the size of the Map by iterating through its entries. For typical Java Iterators, the next( ) method updates the state of the object to reflect the current traversal position. In this case, however, this heap update mutates a local object (allocated by the iterator( ) call), and hence does not affect the correctness of using a read lock. Most attempts to prove such program properties in the literature are again based on costly whole-program analysis, but we show in Section 4 that a carefully-designed local analysis often suffices for the task of read lock inference.

3. Introducing Reentrant Locks

The CONVERT TO REENTRANT LOCK refactoring allows the programmer to replace all uses of a built-in monitor with corresponding uses of an object of type ReentrantLock; in particular, it can transform the code from FIG. 1(a) to that of FIG. 1(b). All operations on built-in monitors have their equivalent on reentrant locks, and moreover the semantics of reentrant locks with respect to ordering, visibility and atomicity is the same as for built-in monitors [20]. Hence this refactoring preserves program behavior as long as it is performed consistently in the following sense: two operations on the same built-in monitor in the original program either still operate on the same monitor in the refactored program, or they have both been refactored to work on the same reentrant lock, and vice versa.

Because using ReentrantLock objects for locking generally carries a higher overhead than using built-in monitors on modem JVMs, this refactoring will often degrade program performance. As explained previously, however, reentrant locks offer additional features, such as non-block-structured locking, that may be useful in some circumstances. While this refactoring does not aim to introduce the use of such features into the program, it makes it much easier for the programmer to experiment with them; it also lays the groundwork for a more sophisticated refactoring for converting reentrant locks to read-write locks, introduced in Section 4.

It is, of course, not possible for the refactoring to transform a single monitor as it exists at runtime into a reentrant lock, as the same synchronized block in the program source may be executed multiple times at runtime, entering and exiting a different monitor each time. Hence, it is more correct to think of the refactoring as changing a set M of monitors into a set L of reentrant locks. To achieve the goal of consistently refactoring all uses of monitors from M to corresponding uses of locks from L, we have to answer two questions: (1) which monitor uses have to be refactored together, and (2) how they ought to be refactored. To answer question 1, we must categorize all uses of built-in monitors into those that operate on a monitor from M (and hence must be refactored) and those that cannot possibly do so. To answer the second question, we have to uniquely assign a lock from L to every monitor from M, and replace all relevant monitor uses with a use of the corresponding lock.

In principle, the two questions are independent. However, answering the second question leads to a simple and practical answer to the first, so we first discuss how to perform the refactoring.

3.1 How to Refactor

We call a language construct that operates on a built-in monitor a monitor action. Every monitor action a has a monitor expression me(a) that evaluates to the object whose monitor is accessed by the action. There are four kinds of monitor actions:

1. synchronized instance methods, which enter and exit the monitor of their receiver object; their monitor expression is this;
2. synchronized static methods, which enter and exit the monitor of the class object for their enclosing class; their monitor expression is a class literal for that class;
3. synchronized blocks, which enter and exit the monitor of the object their expression evaluates to; that expression is their monitor expression;
4. calls to methods wait, notify and notifyAll, which operate on the monitor of their receiver object; their monitor expression is their receiver argument.

Note that both types of synchronized methods can easily be desugared into synchronized blocks. Hence, we limit our discussion to handling of synchronized blocks and calls to wait or notify.

For a synchronized block with monitor expression e, let lock expression l(e) evaluate to a corresponding reentrant lock. Given l(e), the block can be rewritten like this:

```
synchronized (e)    {    l(e).lock( );
                   ⇒     try {
                           ...
                         } finally {
                           l(e).unlock( );
                         }
```

As the program transformation is straightforward, the main problem in performing the refactoring is determining l(e).

Our strategy for associating a reentrant lock with an object o is to store the lock in an instance field l of o. This technique is natural, as it matches the association of Java's built-in monitors with unique objects. Syntactically, the refactoring needs to insert a public, final instance field l of type ReentrantLock into the declaration of the class of o, and initialize the field to a new instance of ReentrantLock. With this field, l(e) can simply be defined as e.l. This strategy only works if the type of o is a class (since Java interfaces cannot have instance fields) and if the source code of the class is modifiable, i.e., it cannot be a library class.

For static synchronized methods, the instance field insertion strategy does not work: the locked object for a synchronized static method in class C is of type Class<C>, which cannot be modified. Fortunately, we can achieve the same effect by storing the reentrant lock in a new static field C.l (again, assuming C is modifiable). In this case, if the monitor expression e is C. class, we define l(e) to be C.l.

This leaves us with the case of monitor actions on expressions whose type is neither a parameterized instance of Class nor a modifiable class. Such monitor actions occur quite frequently in real code, and hence cannot be ignored by the refactoring. A common usage pattern of this kind is shown in FIG. 3: class C has a member field m, which is initialized to a fresh instance (of class HashMap), and is used to synchronize access to other data (in this case the map itself).

Fortunately, we can exploit encapsulation to handle most cases like that of FIG. 3. Note that the reference stored in m is never leaked in any way, so the stored HashMap object is only accessible through m itself. Consequently, the field satisfies the following important property:

Any monitor action that operates on the monitor of an object stored in the field must access it through that very field.

We call fields with this property unshared.

The field m of FIG. 3 is unshared, since it is only ever assigned newly created objects, its value is never assigned to another variable, and the methods invoked on it (HashMap.put and HashMap.get) do not leak the value of their receiver object. In Section 5, we will discuss a simple syntactic check to determine whether a field is unshared.

Suppose we want to refactor the set of monitors associated with all the objects stored in an unshared field like m. To associate lock objects with these monitors, we introduce a new lock field l into m's enclosing class C (which must be modifiable). Every monitor action operating on m has a monitor expression of the form e.m, so we can easily refactor it into a corresponding lock operation on e.l.

To refactor invocations of wait and notify, we utilize the condition variables of type Condition associated with ReentrantLocks. Multiple condition variables can be associated with a ReentrantLock via calls to newCondition( ), but for our refactoring only one such variable is needed. The refactoring introduces an additional condition variable field c alongside the lock field l and initializes it to a new variable whenever l is initialized to a new lock. Uses of wait and notify can then be straightforwardly rewritten into corresponding uses of await and signal on c.

3.2 What to Refactor

The previous subsection introduced three ways of associating a lock object with a built-in monitor: as an instance field of the type C of the object to which the monitor belongs, as a class field of the type C to whose class object the monitor belongs, and as a sibling field of the unshared field f to whose value the monitor belongs.

This suggests an abstraction of sets of monitors as abstract monitors of the following three types:

1. for a type C, the T-monitor TM(C) represents the monitors belonging to all objects of type C or its subtypes;
2. for a type C, the C-monitor CM(C) represents the (single) monitor belonging to the class object of type C;
3. for an unshared field f, the F-monitor FM(f) represents the monitors of all objects stored in f.

For an abstract monitor M, we write [[M]] to denote the set of concrete monitors it represents. We write $M \subseteq M'$, to denote $[[M]] \subseteq [[M']]$, and $M \perp M'$ to denote $[[M]] \cap [[M']] = \emptyset$. For instance, we have $CM(C) \subseteq TM$ (java.lang.Object) for any class C, since Class<C> extends java.lang.Object. Similarly, if field f f has type C, then $FM(f) \subseteq TM(C)$; and, of course, $TM(C) \subseteq TM(B)$ whenever C is a subtype of B.

On the other hand, note that $CM(C) \perp FM(f)$ for every C and f: if the class object of C were stored in f, then f would not be unshared, since its value could be accessed as C .class without reference to f. Likewise, for two unshared fields f and g, [[FM(f)]] and [[FM(g)]] are either equal or disjoint, and they can only be equal if f=g.

To determine which monitor actions to refactor, the refactoring assigns to every monitor action a an abstract monitor M (a) that conservatively over approximates the set of monitors that a could operate on at runtime. Given this assignment, if M is the abstract monitor representing the monitors whose uses are to be replaced with reentrant locks, then all a with $M(a) \subseteq M$ should be refactored, and for all other actions a' we must have $M(a') \perp M$.

A straightforward definition of M (a) is as follows:

$$M(a) := \begin{cases} FM(f) & \text{if me } (a) \text{ is an access to unshared field } f \\ CM(C) & \text{if me } (a) \text{ is of type Class } \langle C \rangle \\ TM(C) & \text{otherwise, where me } (a) \text{ is a type of } C \end{cases}$$

However, this definition does not capture all the information we need. If M(a) is TM(C), we only know that a operates on the monitor of some object assignable to type C. In fact, however, a also cannot operate on the monitor belonging to any object stored in an unshared field (even if that field is of type C), for otherwise M(a) would have to be an F-monitor.

In order to track this additional information, we slightly modify our definition of TM(C):

3'. for a type C, the abstract monitor TM(C) represents the set of all monitors belonging to all objects of type C or its subtypes, except those stored in unshared fields.

The definition of M(a) above still gives a sound over approximation of the set of monitors that a could operate on under this new definition, but it is now very easy to check inclusion and disjointness of abstract monitors.

To describe how we compute inclusion and disjointness, let us first define the type tp(M) of an abstract monitor M by stipulating that tp(CM(C)):=Class<C> and tp(TM(C)):=C, whereas tp(FM(f)) is undefined. Then, it is easy to see that $M \subseteq M'$ iff either M=M' or tp(M) subtype of tp(M'):
$M \perp M'$ iff one of the following holds:
M is FM(f),M' is FM(f'), and f≠f':
M is CM(C),M' is CM(C'), and C≠C':
tp (M) and tp(M') have no common subtype.

3.3 The Algorithm

We now describe the refactoring algorithm in more detail. FIG. 4 gives a pseudocode description of the main procedure of the refactoring, CONVERT TO REENTRANT LOCK. Given an abstract monitor M to refactor, it creates a corresponding lock field using procedure createLockField, and then iterates over all monitor actions in the program. Those actions that must acquire the same monitor ($M(a) \subseteq M$) are refactored using procedure transformAction; for all others, the refactoring ensures that their set of monitors is disjoint from M, and aborts if that is not the case, reverting any changes it has already made.

Procedure createLockField, shown in the same figure, analyzes the kind of M and creates the lock field in the appropriate type, ensuring that the type is modifiable. We ignore here shallow issues to do with name binding; for instance, the name of the lock field cannot have the same name as a field already declared in the same class.

Procedure transformAction syntactically transforms a given monitor action a into a corresponding action on reentrant locks. We use function mkLockAccess to compute an expression l that refers to the reentrant lock object. Finally, transformAction performs the appropriate syntactic transformation of the program. Note that in some cases, l is inserted into the program twice. If l is a complicated expression that should not be evaluated twice, or whose value may have been changed by the block, we can first perform an EXTRACT TEMP refactoring to extract its value into a fresh local variable x, and then perform locking and unlocking on x instead.

We have elided the code to deal with refactoring of wait( ) and notify( ) monitor actions. To handle this, we need a procedure createConditionField to create a field to hold the condition variable, which is completely analogous to createLockField, and procedure transformAction must rewrite the method call in question into an appropriate call on the condition variable field, which is created by a function mkConditionAccess very similar to mkLockAccess.

Observe that this refactoring can fail for three reasons: refactoring the abstract monitor would require refactoring a monitor action that comes from compiled code and is hence not modifiable (Line 21); there are ambiguous monitor actions that cannot be refactored consistently (Line 7); the refactoring would need to modify an unmodifiable type (Lines 10, 15, 18).

4. Introducing Read-Write Locks

As discussed in Section 2, lock contention can sometimes be reduced through use of a read-write lock, which allow threads to read the state protected by the lock concurrently, as long as no other thread is writing the state. In this section, we present a refactoring INTRODUCE READ-WRITE LOCK that enables programmers to more easily experiment with using read-write locks to improve performance in their concurrent programs. Note that we only describe the refactoring for programs already using reentrant locks; the CONVERT TO REENTRANT LOCK refactoring of Section 3 can be used to introduce such locks if needed.

Our refactoring aims to introduce read locks (rather than write locks) whenever it can prove it is safe to do so, thereby maximizing potential concurrency in the transformed program. Conceptually, a reentrant lock l can only be transformed into a read lock if any code that may execute while l is held does not modify the shared state protected by l. Most Java code does not formally document the relationship between locks and the corresponding protected shared state. When such relationships are documented (e.g., through GuardedBy annotations [8]), we can easily use the information in our analysis to potentially infer more read locks.) Hence, our algorithm checks for any modification of potentially shared state while a lock is held and only introduces a read lock when no such modifications are found.

FIG. 5 gives pseudocode for the INTRODUCE READ-WRITE LOCK refactoring. The refactoring takes a field f that must be of type ReentrantLock. It changes the type of the field and adjusts any assignments to f, including its initializer if it has one. This step of the refactoring requires that f may only be assigned newly created objects (line 5) in order to maintain a one-to-one correspondence in the refactored program.

Now every use off is adjusted. To preserve type correctness, all uses off have to be invocations of its lock( ) and unlock( ) methods, and we require that these appear in the standard try-finally pattern seen in earlier examples. In practice, most developers seem to follow this pattern, so this is not a serious restriction. Handling more general cases would require some form of data flow analysis to determine what code executes while the lock is held.

The refactoring now invokes function canUseReadLock (defined in lines 13-19) to determine whether the block b of code protected by the lock is free from non-local side effects, so that a read lock can be introduced. This function, in turn, uses function nonLocalSideEffects to determine whether any of the instructions S in b modify non-local state.

Function nonLocalSideEffects (lines 20-30) takes as parameters a set S of instructions in some method m and a set P of the relevant parameters of m. As shown in the nonLocal- Write function (lines 31-37), a heap write instruction i is deemed non-local iff (1) i writes a static field or (2) i writes an instance field or the array contents of some object o, such that o is reachable (via some sequence of dereferences) from a static field or some parameter in P.

The reachability check is performed via the mayAliasNonLocalState call on line 35 and may be implemented with any conservative may alias analysis.

The parameter set P is used in nonLocalSideEffects to exploit knowledge about purely local objects, which may be safely mutated while a read lock is held. Initially, P contains all formal parameters of the method m containing the protected block b (line 19), as mutations to the state of any of m's parameters may prevent the use of a read lock. When analyzing some method (transitively) called by m, however, we need only consider side effects to formal parameters whose corresponding actual parameters may alias non-local state at the caller (computed by line 27 in the pseudocode). By ignoring writes to local objects in this interprocedural manner, our algorithm is able to infer many more read locks than if it treated all writes as suspect.

FIG. 6 gives an example toString( ) method that illustrates the benefits of ignoring writes to local state. The method appends fields f1 and f2 to a StringBuffer and returns the resulting String while holding the fLock lock. The StringBuffer.append( ) method mutates the state of the StringBuffer. If the analysis did not distinguish writes to local state, this mutation would prevent the use of a read lock. However, our analysis is able to show that the StringBuffer pointed to by the result is purely local. Hence, when the append( ) method is analyzed for side effects, the receiver argument is not considered, enabling the analysis to prove that using a read lock is safe in this case. Note that cases like that of FIG. 5 arise frequently in real code, as String concatenation in Java is performed via allocating local StringBuilder objects and appending to them.

For performance, we bound the call depth to which our analysis searches for side-effecting statements (not shown in FIG. 4 for clarity). If the call depth exceeds the bound, the analysis conservatively assumes that unanalyzed calls may write to non-local state. Potential targets at virtual calls are computed based on the program's class hierarchy. Also, our analysis detects recursive calls and treats them as having no side effects, thereby avoiding spuriously exceeding the call depth bound (while retaining soundness).

In our implementation, we use a demand-driven may-alias analysis to implement the mayAliasNonLocalState procedure. Whole-program pointer analyses are often unsuitable for use in a refactoring tool, due to their performance and their assumption that the whole program is available (which doesn't hold when developing a library, for example). Instead, we determine potential aliasing by computing interprocedural defs and uses as required by the refactoring.

As with the main refactoring, we bound the call depth to be explored by the alias analysis for performance, and we make pessimistic assumptions about method behavior beyond the bound.

5. Evaluation

We have implemented the two refactorings introduced in the previous sections as a plugin for the Eclipse IDE. In this section, we report on an experimental evaluation of these refactorings on real-world benchmarks.

5.1 Introducing Reentrant Locks

Our implementation of CONVERT TO REENTRANT LOCK closely follows the pseudocode given in Section 3. To determine whether a field f is unshared, it checks the following three conditions:

1. any assignment to f assigns it either null or a newly created object;
2. the value of f is never assigned to a field, passed as an argument to a method or constructor, or returned as a result;
3. no method invoked on f can cause its value to become shared.

To check the third condition, we make sure that any method that is invoked on f is discreet, meaning it does not synchronize on this, nor assigns this to a field, nor passes it as an argument or returns it as a result, and only invokes discreet methods on this.

Clearly these conditions are sufficient for f to be an unshared field. While it might be possible to analyze methods for discreetness while performing the refactoring, it turns out that in real-world code only a handful of methods, mostly from the collection classes in the standard library, are ever invoked on unshared fields. We hence decided to hardcode in our implementation a list of methods that we manually checked to be discreet, and consider every other method to be indiscreet.

One issue we encountered was the treatment of monitor actions in compiled code. For performance reasons, it is infeasible to compute the abstract monitor of every such monitor action (which in particular involves local type inference on bytecode methods). Instead, we decided to only consider the monitor actions arising from compiled synchronized methods, ignoring compiled synchronized blocks and calls to wait and notify.

For the CONVERT TO REENTRANT LOCK refactoring, we measured its applicability on several real-world Java programs by exhaustively applying the refactoring to all built-in monitors, trying to refactor as many of them as possible.

Our evaluation aims to answer two basic questions: First, how useful is the proposed classification of abstract monitors, and how many monitors of each kind occur in real-world code? And second, how effective is the refactoring, i.e., what percentage of uses of built-in monitors is it able to refactor, and why does it fail in the other cases?

FIG. 7 is a table of the results of our evaluation. We ran our refactoring on five benchmarks: two fairly large programs, with the database engine HSQLDB at about 140 thousand lines of source code (KSLOC) and the XSLT processor Xalan at 110 KSLOC; and three medium size programs, with the core component of the Apache Hadoop framework at 74 KSLOC, the JGroups toolkit at 62 KSLOC and the distributed database system Apache Cassandra at 36 KSLOC. The plugin is available for download from http://progtools.comlab.ox.ac.uk/projects/refactoring/Relocker.

The first three columns show the classification of all source-level monitor actions in the program, "FM" giving the number of actions whose abstract monitor is an F-monitor, "CM" of those with C-monitors, and "TM" of those with T-monitors.

As it turns out, many monitor actions in real code have nothing to do either with unshared fields or with class objects, the latter two categories often forming a small minority. Nevertheless, it makes sense to give unshared fields a special treatment: many unshared fields are of type Object; if they were classified as T-monitors, they would effectively prevent us from refactoring any other T-monitor, since our type-based analysis would not be able to exclude the possibility of aliasing.

The next three columns of the table account for those monitor actions that could not be refactored, categorizing them according to the source of failure: the first column gives the number of monitor actions that could not be refactored because this would necessitate refactoring another monitor action which is not from source; the second tallies those monitor actions where another monitor action was encountered that might operate on the same monitor, but does not definitely do so; and the final column shows the number of monitor actions that could not be refactored because the refactoring would have entailed modifying an unmodifiable type declaration.

Monitor actions of the first category are often synchronized methods in user-defined subclasses of the library class java.lang.Thread: that class has some synchronized methods which cannot be changed, so neither can the methods in any of its subclasses. For many of the monitor actions in the second category, a more precise analysis would presumably be able to prove that no monitor aliasing is possible and hence allow the refactoring to go ahead; nevertheless it is encouraging to see that even a very simple type-based analysis can handle most cases well enough. The final column gives the percentage of monitor actions that could be successfully refactored. Generally, our tool is able to refactor upwards of 80% of all monitor actions, in some cases significantly more. We do not suggest that all these monitor actions should be replaced by corresponding uses of reentrant locks: that is not for a refactoring tool to decide. Rather, our tool provides the possibility for the programmer to perform this refactoring successfully in the vast majority of cases at the push of a button.

5.2 Introducing Read-Write Locks

Our implementation of INTRODUCE READ-WRITE LOCK closely follows the pseudocode presented earlier (see FIG. 4 in Section 4). The side-effect and alias analyses are implemented using WALA [31]. In our experiments, we bound the call depth explored by the main refactoring to 6 and the alias analysis depth for 1; larger bounds yielded little benefit in our experiments.

Our implementation relies on specifications in which the heap-updating side-effects are described for certain frequently used (and frequently overridden) methods from the standard Java library, e.g., equals( ) and hashCode( ) from java.lang.Object, some methods of class String and StringBuffer, and several methods from the Java Collections Framework. These specifications significantly improve the effectiveness of the refactoring, as they allow the refactoring to skip analysis of common library methods and certain well-understood methods from the application (e.g., implementations of equals( )), improving performance and precision. It is possible for some of these specifications to introduce unsoundness in the case of overriding methods, e.g., if some implementation of equals( ) mutates the abstract state of the receiver object. We have not encountered any such cases in our experience, and we believe that the remote chance of unsoundness is outweighed by the significantly improved effectiveness of the refactoring.

To evaluate the INTRODUCE READ-WRITE LOCK refactoring, we looked at six major applications that already use read-write locks. We then manually refactored them back to reentrant locks, and used our tool to attempt to "re-infer" the original read-write lock usage. Our measure of success for this refactoring is simply how many uses of read locks the refactoring is able to infer correctly. (Inferring write locks is, of course, trivial.)

The results of this experiment are given in a table in FIG. 8. We use mostly the same benchmarks as above, except for Xalan, which does not use read-write locks at all; instead, we consider the Apache MINA network application framework, a medium-sized program of 51 KSLOC, and the J2EE web application security framework Atlassian Seraph, which consists of only about 5000 lines of source code.

For each benchmark, we give the total number of read-write lock fields in the program. Next, we list the number of uses of the read and write locks, respectively, and finally the number and percentage of correctly inferred read locks. In all cases with write locks, our analysis soundly determined that use of a read lock was unsafe. Note that the rate of correctly inferred read locks varies quite dramatically between different benchmarks. While we are able to correctly infer all read locks for MINA, Hadoop, JGroups and Seraph, we catch less than half for Cassandra, and even less for HSQLDB.

HSQLDB in particular makes fairly sophisticated use of read locks: in several cases, the code deliberately allows racy updating of cache fields, since the cached data is not mutated at the same time, and hence the result will always be consistent. Similar issues arose with some uses of read locks in Cassandra. The kind of global reasoning required to prove the safety of read locks in such cases is clearly beyond the capabilities of our tool, and it seems likely that any analysis powerful enough to deal with this kind of situation would be too heavyweight for use in a refactoring tool.

In contrast to CONVERT TO REENTRANT LOCK, the INTRODUCE READ-WRITE LOCK refactoring hardly ever fails, since it can always just replace uses of the reentrant lock with uses of the write lock. We envision its use as a first step in converting a reentrant lock to a read-write lock: it will consistently update the declaration and all uses, and directly introduce read locks for the simple cases, staying on the safe side and introducing write locks for the trickier ones. It is then up to the programmer to convert those remaining locks to read locks, based on their understanding of the semantics of the program.

Example Flow Diagram

FIG. 9 is a flow diagram of the computer implemented method to refactor a software application. In one embodiment, the software application is written in Java, however the present invention is not limited to only Java and is applicable to a large range of software.

The process begins at step 902 and immediately proceeds to step 904. A software application, or at least a portion of a software application, is available to execute in a parallel processing operating environment. The parallel environment, such as a multi-core and/or multi-processor environment, enables two or more threads to be executed substantially simultaneously. Next, in step 906, a determination is made if there is at least one lock used in the software application to enforce limits on accessing a resource, such as data in a storage location or in a database. In step 908, in response to determining there is at least one lock with a first type of construct with a given set of features, at least a portion of the software application is refactored with the lock to preserve behavior of the software application. Stated differently, the refactoring changes at least a portion of the source code of the software application without modifying its external functional behavior.

In one embodiment, the set of lock usages with the first type of construct includes locks with no writes to memory. In another embodiment the set of lock usages with the first type of construct includes at least one of an acquire lock and a release lock. Also, in another embodiment, the set of lock usages with the first type of construct includes non-local side effects. These non-local side effects can include an acquire lock and/or a create new object and/or a perform write on new object, and/or a release object. Furthermore, the set of lock usages with the first type of construct often times includes a condition variable.

As part of step 908, each of steps 910 and 912 are performed. In step 910 at least one type of lock usages, e.g. monitor M, is determined. This lock usage includes which type of lock of usages must be refactored together. In step 912, the lock is reassigned to one of a set of lock usages with a second type of construct. In one embodiment, the set of lock usages with the second type of construct include use of special features. In yet embodiment, the second type of construct includes at least one read-write lock. The process flow ends in step 914.

In this example, Java class libraries provide flexible locking constructs that improve performance by reducing lock contention. Experimenting with these locks has been difficult as it requires non-trivial program analysis. We have presented algorithms for determining how programs can be refactored to use ReentrantLocks and ReadWriteLocks instead of standard monitor locks, and implemented these algorithms in an automated refactoring tool called Relocker. In an evaluation on a collection of Java programs, Relocker was able to convert over 80% of the monitor locks in these programs into ReentrantLocks. Moreover, Relocker was able to infer read-locks in most cases where programmers had previously introduced them manually.

The present invention may be adapted to be used with the design of refactorings for shrinking the regions of code protected by locks, possibly by taking advantage of the ability of ReentrantLocks to protect non-block-structured regions. In the same spirit, one could take advantage of the ability of ReadWriteLocks to safely downgrade from a write-lock to a read-lock in order decrease lock contention.

Non-Limiting Hardware Embodiments

Figure 10:
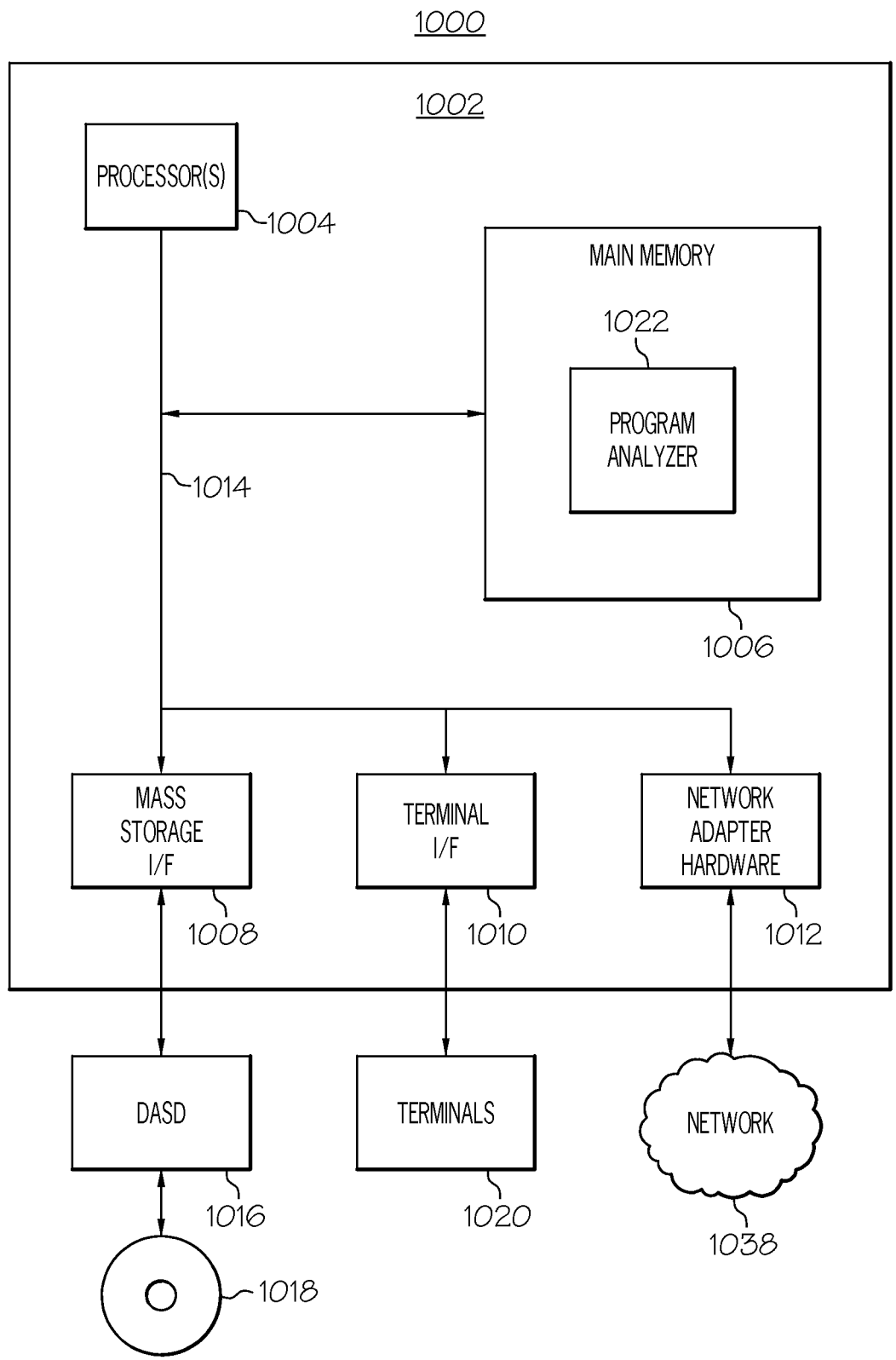
FIG. 10 is a block diagram of a computer system useful for implementing the software steps of the present invention.

FIG. 10 is a block diagram of a computer system useful for implementing the software steps of the present invention.

FIG. 10 is a block diagram illustrating a more detailed view of a computer system or information processing system 1000, useful to refactor a software application. The information processing system 1000 is based upon a suitably configured processing system adapted to implement one or more embodiments of the present invention. Similarly, any suitably configured processing system can be used as the information processing system 1000 by embodiments of the present invention.

The information processing system 1000 includes a computer 1002. The computer 1002 has a processor(s) 1004 that is connected to a main memory 1006, mass storage interface 1008, and network adapter hardware 1010 coupled to network 1014. A system bus 1014 interconnects these system components. The main memory 1006, in one embodiment, comprises the refactoring tool 1022, such as Relocker, as discussed above.

Although illustrated as concurrently resident in the main memory 1006, it is clear that respective components of the main memory 1006 are not required to be completely resident in the main memory 1006 at all times or even at the same time. In one embodiment, the information processing system 1000 utilizes conventional virtual addressing mechanisms to allow programs to behave as if they have access to a large, single storage entity, referred to herein as a computer system memory, instead of access to multiple, smaller storage entities such as the main memory 1006 and data storage device 1016. Note that the term "computer system memory" is used herein to generically refer to the entire virtual memory of the information processing system 1006.

The mass storage interface 1008 is used to connect mass storage devices, such as mass storage device 1014, to the information processing system 1000. One specific type of data storage device is an optical drive such as a CD/DVD drive, which may be used to store data to and read data from a computer readable medium or storage product such as (but not limited to) a CD/DVD 1018. Another type of data storage device is a data storage device configured to support, for example, NTFS type file system operations.

Although only one CPU 1004 is illustrated for computer 1002, computer systems with multiple CPUs can be used equally effectively. Embodiments of the present invention further incorporate interfaces that each includes separate, fully programmed microprocessors that are used to off-load processing from the CPU 1004. An operating system (not shown) included in the main memory is a suitable multitasking operating system such as any of the Linux, UNIX, Windows, and Windows Server based operating systems. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 1000. The network adapter hardware 1012 is used to provide an interface to a network 1038. Embodiments of the present invention are able to be adapted to work with any data communications connections including present day analog and/or digital techniques or via a future networking mechanism. A terminal interface 1110 for displaying a user interface (not shown) is couple to bus 1114 for communicating with user terminals 1120.

Although the exemplary embodiments of the present invention are described in the context of a fully functional computer system, those of ordinary skill in the art will appreciate that various embodiments are capable of being distributed as a program product via CD or DVD, e.g. CD 1016, CD ROM, or other form of recordable media, or via any type of electronic transmission mechanism.

Cloud Environment

It is understood in advance that although the following is a detailed discussion on cloud computing, implementation of the teachings recited herein are not limited to a cloud computing environment. Rather, various embodiments of the present invention are capable of being implemented in conjunction with any other type of computing environment now known or later developed. For example, various embodiments of the present invention are applicable to any computing environment with a virtualized infrastructure or any other type of computing environment.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto. However, it should be noted that cloud computing environments that are applicable to one or more embodiments of the present invention are not required to correspond to the following definitions and characteristics given below or in the "Draft NIST Working Definition of Cloud Computing" publication. It should also be noted that the following definitions, characteristics, and discussions of cloud computing are given as non-limiting examples.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
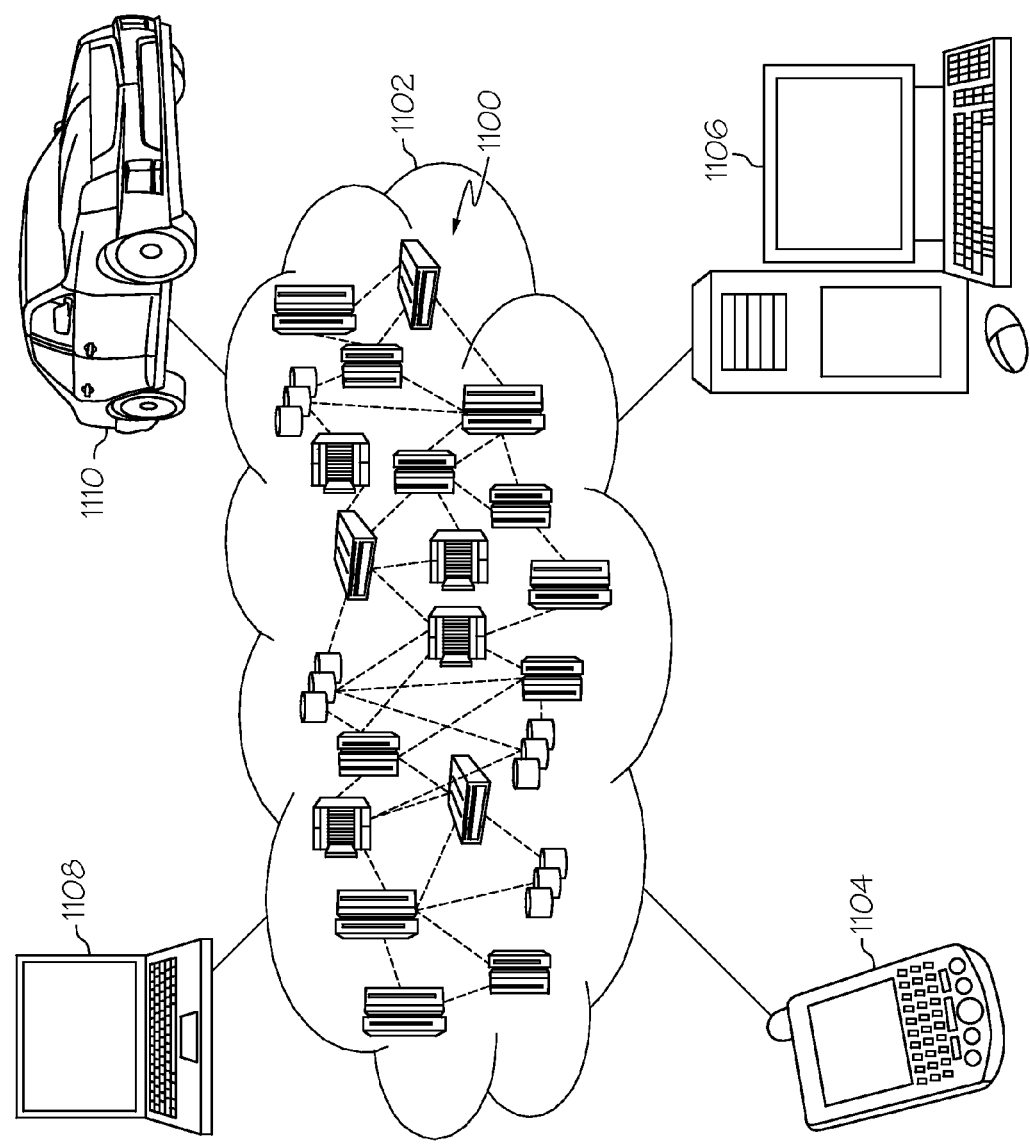
FIG. 11 illustrates one example of a cloud computing environment according to one example of the present invention.

Referring now to FIG. 11, illustrative cloud computing environment 1102 is depicted. As shown, cloud computing environment 1102 comprises one or more cloud computing nodes 700 with which local computing devices used by cloud consumers, such as, for example, personal digital assistant (PDA) or cellular telephone 1104, desktop computer 1106, laptop computer 1108, and/or automobile computer system 1110 may communicate. Nodes 1104, 1106, 1106, 1110 can communicate with one another. They may be grouped (not shown) physically or virtually, in one or more networks, such as Private, Community, Public, or Hybrid clouds as described hereinabove, or a combination thereof. This allows cloud computing environment 1102 to offer infrastructure, platforms and/or software as services for which a cloud consumer does not need to maintain resources on a local computing device. It is understood that the types of computing devices 1104, 1106, 1108, 1010 shown in FIG. 11 are intended to be illustrative only and that computing nodes 1100 and cloud computing environment 1002 can communicate with any type of computerized device over any type of network and/or network addressable connection (e.g., using a web browser).

Figure 12:
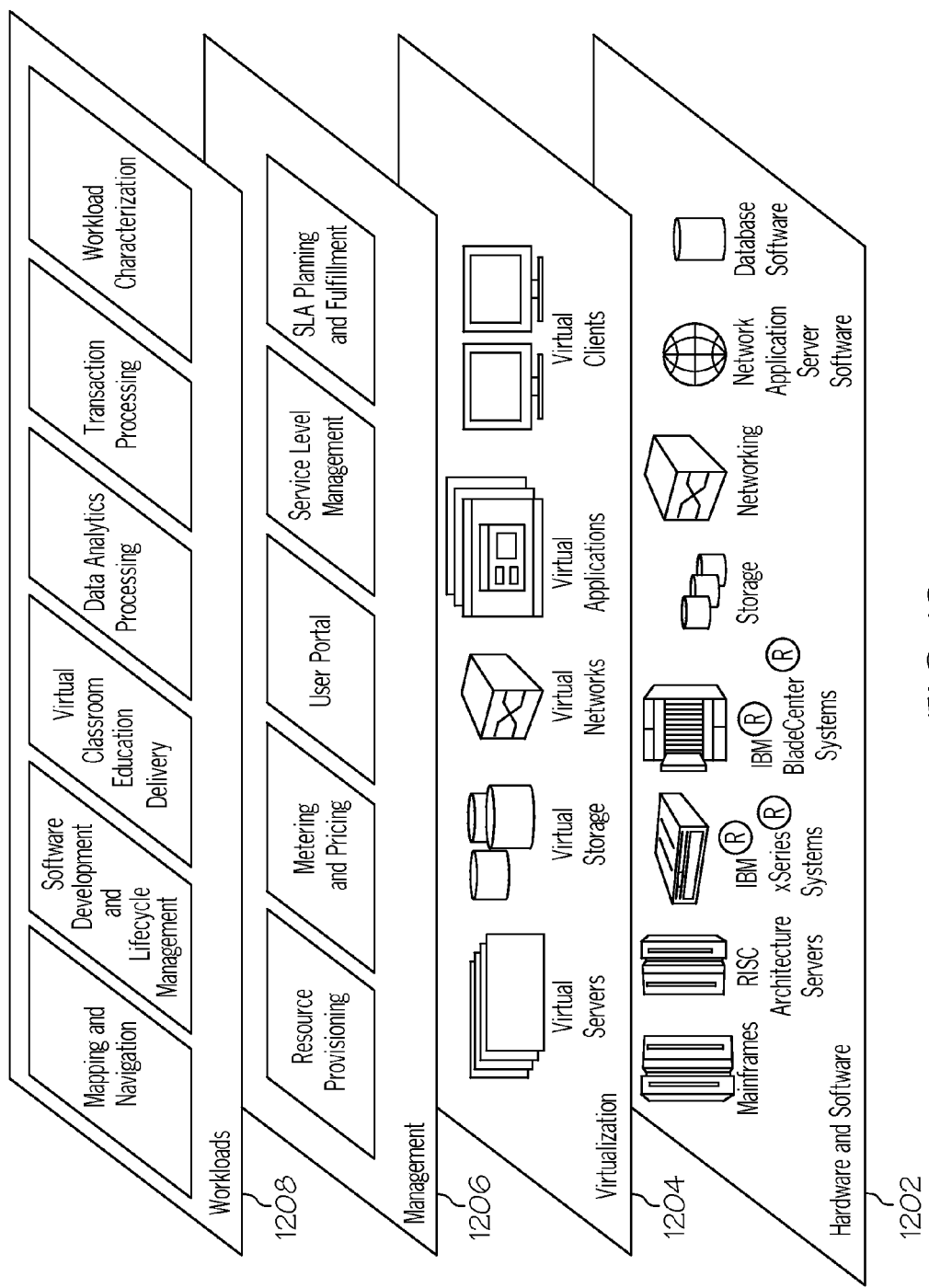
FIG. 12 illustrates abstraction model layers according to one example of the present invention.

Referring now to FIG. 12, a set of functional abstraction layers provided by cloud computing environment 1102 of FIG. 11 is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1202 includes hardware and software components. Examples of hardware components include mainframes, in one example IBM® System z® systems; RISC (Reduced Instruction Set Computer) architecture based servers, in one example IBM System p® systems; IBM System x® systems; IBM BladeCenter® systems; storage devices; networks and networking components, such as those shown in FIG. 10. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1204 provides an abstraction layer from which the following examples of virtual entities may be provided: virtual servers; virtual storage; virtual networks, including virtual private networks; virtual applications and operating systems; and virtual clients.

In one example, management layer 1206 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1208 provides examples of functionality for which the cloud computing environment may be utilized. Examples of workloads and functions which may be provided from this layer include: mapping and navigation; software development and lifecycle management; virtual classroom education delivery; data analytics processing; transaction processing; and workload characterization, as discussed above.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

References

Each of the following thirty-two references are hereby incorporated by reference in their entirety.

REFERENCES

[1] Balaban, F. Tip, and R. M. Fuhrer. Refactoring support for class library migration. In OOPSLA, 2005.
[2] D. Dig, J. Marrero, and M. D. Ernst. Refactoring Sequential Java Code for Concurrency via Concurrent Libraries. In ICSE, 2009.
[3] D. Dig, S. Negara, V. Mohindra, and R. E. Johnson. ReBA: Refactoring-aware Binary Adaptation of Evolving Libraries. In ICSE, 2008.
[4] D. Dig, C. Radoi, M. Tarce, M. Minea, and R. Johnson. RELOOPER: Refactoring for Loop Parallelism. Technical report, UIUC, 2010. http://hdl.handle.net/2142/14536.
[5] A. Donovan, A. Kie'zun, M. S. Tschantz, and M. D. Ernst. Converting Java Programs to Use Generic Libraries. In OOPSLA, 2004.
[6] R. Fuhrer, F. Tip, A. Kie'zun, J. Dolby, and M. Keller. Efficiently Refactoring Java Applications to Use Generic Libraries. In ECOOP, 2005.
[7] R. M. Fuhrer and V. Saraswat. Concurrency Refactoring for X10. In Proceedings of the Third Workshop on Refactoring Tools, 2009.
[8] B. Goetz, T. Peierls, J. Bloch, J. Bowbeer, D. Lea, and D. Holmes. Java Concurrency in Practice. Addison-Wesley Professional, 2005.
[9] W. G. Griswold. Program Restructuring as an Aid to Software Maintenance. PhD thesis, University of Washington, 1991. Technical Report Aug. 4, 1991.
[10] W. G. Griswold and D. Notkin. Automated Assistance for Program Restructuring. ACM Trans. Softw. Eng. Methodol., 2(3), 1993.
[11] M. Herlihy and J. E. B. Moss. Transactional memory: Architectural support for lock-free data structures. In ISCA, pages 289-300, 1993.
[12] H. Kegel and F. Steimann. Systematically Refactoring Inheritance to Delegation in Java. In ICSE, 2008.
[13] J. Kerievsky. Refactoring to Patterns. Addison-Wesley, 2004.
[14] A. Kie'zun, M. Ernst, F. Tip, and R. Fuhrer. Refactoring for Parameterizing Java Classes. In ICSE, 2007.
[15] S. Markstrum, R. M. Fuhrer, and T. D. Millstein. Towards Concurrency Refactoring for X10. In PPOPP, 2009.
[16] M. M. Michael and M. L. Scott. Simple, fast, and practical non-blocking and blocking concurrent queue algorithms. In PODC, pages 267-275, 1996.
[17] E. R. Murphy-Hill and A. P. Black. Breaking the barriers to successful refactoring: observations and tools for extract method. In ICSE, 2008.
[18] E. R. Murphy-Hill, C. Parnin, and A. P. Black. How we refactor, and how we know it. In ICSE, 2009.
[19] W. F. Opdyke. Refactoring Object-Oriented Frameworks. PhD thesis, UIUC, 1992.
[20] Oracle. Java SE 6, API Specification. http://download.oracle.com/javase/6/docs/api/, 2010.
[21] C. Reichenbach, D. Coughlin, and A. Diwan. Program Metamorphosis. In ECOOP, 2009.
[22] D. B. Roberts. Practical Analysis for Refactoring. PhD thesis, UIUC, 1999.
[23] M. Schäfer and O. de Moor. Specifying and Implementing Refactorings. In OOPSLA, 2010. To appear.
[24] M. Schäfer, J. Dolby, M. Sridharan, E. Torlak, and F. Tip. Correct Refactoring of Concurrent Java Code. In ECOOP, 2010.
[25] M. Schäfer, M. Verbaere, T. Ekman, and O. de Moor. Stepping Stones over the Refactoring Rubicon. In ECOOP, 2009.
[26] F. Steimann and A. Thies. From Public to Private to Absent: Refactoring Java Programs under Constrained Accessibility. In ECOOP, 2009.
[27] F. Tip. Refactoring Using Type Constraints. In SAS, 2007.
[28] F. Tip, A. Kie'zun, and D. Baumer. Refactoring for Generalization using Type Constraints. In OOPSLA, 2003.
[29] M. Verbaere, R. Ettinger, and O. de Moor. Jungl: a scripting language for refactoring. In ICSE, 2006.
[30] D. von Dincklage and A. Diwan. Converting Java Classes to Use Generics. In OOPSLA, 2004.
[31] T. J. Watson Libraries for Analysis (WALA). http://wala.sf.net.
[32] Wloka, M. Sridharan, and F. Tip. Refactoring for Reentrancy. In ESEC/FSE, 2009.

What is claimed is:

1. A computer-implemented method to refactor a software application, the computer-implemented method comprising:
executing, with a processor on an information processing system, the following
accessing at least a portion of an original software application that can execute in an operating environment where there are more two or more time-shared threads of execution;
determining if there is at least one lock used in the original software application to enforce limits on accessing a resource;
in response to determining there is at least one lock with a first type of construct with a given set of features, refactoring at least a portion of the original software application with the lock to preserve external functional behavior of a refactored software application such that the refactored software application is functionally equivalent before and after the refactoring for each concurrent user in a set of at least two concurrent users of the refactored software application with the two or more time-shared threads of execution, by
identifying at least one use of the first type of construct for the lock, and further identifying all uses of that first type of construct for the lock in the original software application which must be refactored together in order to preserve external functional behavior in all possible cases;

reassigning the lock to one of a set of lock usages with a second type of construct; and transforming the lock usages in the first type of construct for the lock that have been identified to the second type of construct for that lock, such that the second type of construct for the lock is always acquired and released whenever the first type of construct for the lock was in the original software application.

2. The computer-implemented method of claim 1, wherein the set of lock usages with the first type of construct includes writes to memory.

3. The computer-implemented method of claim 1, wherein the set of lock usages with the first type of construct includes at least one of an acquire lock and a release lock.

4. The computer-implemented method of claim 1, wherein the set of lock usages with the first type of construct includes local side effects.

5. The computer-implemented method of claim 4, wherein the local side effects includes at least one of an acquire lock, a create new object, a perform write on new object, and a release object.

6. The computer-implemented method of claim 1, wherein the set of lock usages with the first type of construct includes a condition variable.

7. The computer-implemented method of claim 1, wherein the set of lock usages with the second type of construct include use of special features.

8. The computer-implemented method of claim 1, wherein the second type of construct includes at least one read-write lock.

9. The computer-implemented method of claim 1, wherein the set of lock usages with the second type of construct improves concurrency resulting in execution performance of the software application by reducing lock contention.

10. The computer-implemented method of claim 1, wherein the software application is written in the Java programming language.

11. A computer program product to refactor a software application, the computer program product comprising:

a storage medium readable by a computer system, the storage medium storing software programming instructions capable of performing with a processor programming code to carry out:

accessing at least a portion of an original software application that can execute in an operating environment where there are more two or more time-shared threads of execution;

determining if there is at least one lock used in the original software application to enforce limits on accessing a resource;

in response to determining there is at least one lock with a first type of construct with a given set of features, refactoring at least a portion of the original software application with the lock to preserve external functional behavior of a refactored software application such that the refactored software application is functionally equivalent before and after the refactoring for each concurrent user in a set of at least two concurrent users of the refactored software application with the two or more time-shared threads of execution, by identifying at least one use of the first type of construct for the lock, and further identifying all uses of that first type of construct for the lock in the original software application which must be refactored together in order to preserve external functional behavior in all possible cases;

reassigning the lock to one of a set of lock usages with a second type of construct; and transforming the lock usages in the first type of construct for the lock that have been identified to the second type of construct for that lock, such that the second type of construct for the lock is always acquired and released whenever the first type of construct for the lock was in the original software application.

12. The computer program product of claim 11, wherein the set of lock usages with the first type of construct includes writes to memory.

13. The computer program product of claim 11, wherein the set of lock usages with the first type of construct includes at least one of an acquire lock and a release lock.

14. The computer program product of claim 11, wherein the set of lock usages with the first type of construct includes local side effects.

15. The computer program product of claim 14, wherein the local side effects includes at least one of an acquire lock, a create new object, a perform write on new object, and a release object.

16. The computer program product of claim 11, wherein the set of lock usages with the first type of construct includes a condition variable.

17. The computer program product of claim 11, wherein the set of lock usages with the second type of construct include use of special features.

18. The computer program product of claim 11, wherein the second type of construct includes at least one read-write lock.

19. The computer program product of claim 11, wherein the set of lock usages with the second type of construct improves concurrency resulting in execution performance of the software application by reducing lock contention.

20. The computer program product of claim 11, wherein the software application is written in the Java programming language.

21. A system to refactor a software application, the system comprising:

a computer memory capable of storing machine instructions; and a processor in communication with said computer memory, said processor capable of accessing said machine instructions to perform:

accessing at least a portion of an original software application that can execute in an operating environment where there are more two or more time-shared threads of execution;

determining if there is at least one lock used in the original software application to enforce limits on accessing a resource;

in response to determining there is at least one lock with a first type of construct with a given set of features, refactoring at least a portion of the original software application with the lock to preserve external functional behavior of a refactored software application such that the refactored software application is functionally equivalent before and after the refactoring for each concurrent user in a set of at least two concurrent users of the refactored software application with the two or more time-shared threads of execution, by identifying at least one use of the first type of construct for the lock, and further identifying all uses of that first type of construct for the lock in the original software application which must be refactored together in order to preserve external functional behavior in all possible cases;

reassigning the lock to one of a set of lock usages with a second type of construct; and transforming the lock usages in the first type of construct for the lock that have been identified to the second type of construct for that lock, such that the second type of construct for the lock is always acquired and released whenever the first type of construct for the lock was in the original software application.

22. The system of claim 21, wherein the set of lock usages with the first type of construct includes writes to memory.

23. The system of claim 21, wherein the set of lock usages with the first type of construct includes at least one of an acquire lock and a release lock.

24. The system of claim 21, wherein the set of lock usages with the first type of construct includes local side effects.

25. The system of claim 24, wherein the local side effects includes at least one of an acquire lock, a create new object, a perform write on new object, and a release object.

\* \* \* \* \*